United States Patent
Bharadwaj et al.

(10) Patent No.: US 9,603,106 B2
(45) Date of Patent: *Mar. 21, 2017

(54) HS-DPCCH OVERHEAD REDUCTION IN MULTI-RAB SCENARIOS

(71) Applicant: QUALCOMM Incorporated, San Diego, CA (US)

(72) Inventors: Arjun Bharadwaj, San Diego, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,276

(22) Filed: Oct. 16, 2014

(65) Prior Publication Data

US 2015/0271769 A1 Sep. 24, 2015

Related U.S. Application Data

(60) Provisional application No. 61/969,014, filed on Mar. 21, 2014.

(51) Int. Cl.
*H04W 52/32* (2009.01)
*H04W 52/14* (2009.01)
(Continued)

(52) U.S. Cl.
CPC ....... *H04W 52/325* (2013.01); *H04W 52/146* (2013.01); *H04W 52/16* (2013.01);
(Continued)

(58) Field of Classification Search
CPC . H04W 52/146; H04W 52/241; H04W 52/24; H04W 52/325; H04B 7/0413
See application file for complete search history.

(56) References Cited

U.S. PATENT DOCUMENTS 8,873,535 B2 * 10/2014 Arulprakasam ...... H04L 1/1685
370/346
9,055,533 B2 * 6/2015 Raskin ................ H04W 52/146
(Continued)

OTHER PUBLICATIONS

Huawei et al., "RAN1 Specification impact for the introduction of HS-DPCCH overhead reduction", 3GPP Draft; R1-140691 RAN1 Specification Impact for Introduction of HS-DPCCH Overhead Reduction, 3rd Generation Partnership Project (3GPP), Mobile Competence Centre; 650, Route Des Lucioles; F-06921, vol. RAN WG1, No. Prague, Czech Republic; 20140210-201470214, Feb. 1, 2014 (Feb. 1, 2014), XP050752208, 4 pages.
(Continued)

*Primary Examiner* — Bobbak Safaipour
(74) *Attorney, Agent, or Firm* — Arent Fox LLP

(57) ABSTRACT

The disclosure provides for reducing uplink control channel overhead at a user equipment (UE). The UE may determine that a total transmit power of the UE exceeds an allocated power. The UE may then scale a transmit power of a high-speed dedicated physical control channel (HS-DPCCH) relative to a dedicated physical control channel (DPCCH) in response to the determination that the UE is power limited. The UE may scale the transmit power of the HS-DPCCH when there is no downlink activity as determined, for example, by expiration of a timer. In an aspect, the UE may transmit an indication that the UE is power limited, for example, by using a most-significant bit of a transport format combination index. In another aspect, the UE may receive an indication that a downlink transmission is imminent and, in response, the UE may transmit the HS-DPCCH without scaling its corresponding transmit power.

25 Claims, 9 Drawing Sheets

(51) Int. Cl.
*H04W 52/16* (2009.01)
*H04W 52/34* (2009.01)
*H04W 52/22* (2009.01)
*H04W 52/24* (2009.01)
*H04W 52/36* (2009.01)

(52) U.S. Cl.
CPC ....... *H04W 52/346* (2013.01); *H04W 52/367* (2013.01); *H04W 52/223* (2013.01); *H04W 52/241* (2013.01); *H04W 52/246* (2013.01); *H04W 52/365* (2013.01)

(56) References Cited

U.S. PATENT DOCUMENTS

| | | | | |
|---|---|---|---|---|
| 9,332,503 | B2* | 5/2016 | Ma | H04W 52/146 |
| 9,474,032 | B2* | 10/2016 | Geng | H04W 52/04 |
| 2008/0144741 | A1* | 6/2008 | Dominique | H04B 17/327 375/317 |
| 2012/0093011 | A1* | 4/2012 | Ranta-Aho | H04L 5/0007 370/252 |
| 2013/0021915 | A1 | 1/2013 | Catovic et al. | |
| 2013/0142119 | A1* | 6/2013 | Wong | H04L 1/1671 370/328 |
| 2013/0201940 | A1* | 8/2013 | Zhang | H04W 52/12 370/329 |
| 2014/0141831 | A1* | 5/2014 | Ma | H04W 52/146 455/522 |
| 2015/0036668 | A1* | 2/2015 | Kanamarlapudi | H04W 52/146 370/336 |
| 2015/0163754 | A1* | 6/2015 | Konuskan | H04W 72/0473 455/522 |
| 2016/0037461 | A1* | 2/2016 | Geng | H04W 52/04 455/522 |

OTHER PUBLICATIONS

Huawei et al., "TP on solutions for UL control channel overhead reduction", 3GPP Draft; R1-134842—TP on Solutions for UL Control Channel Overhead Reduction, 3rd Generatin Partnership Project (3GPP), Mobile Competence Centre ; 650, Route Des Lucioles; F-06921 Sophia-Antipo, vol. RAN WG1, No. Guanzhou, China; 20131007-20131011, Oct. 28, 2013 (Oct. 28, 2013), XP050750470, 5 pages.

International Search Report and Written Opinion—PCT/US2015/020486—ISA/EPO—Jun. 23, 2015. (13 total pages).

Huawei, Hisilicon, "Adaptive QCI cycle solution for HS-DPCCH overhead reduction," 3GPP TSG-RAN WG1 Meeting #76, Feb. 10-14, 2014, R1-140689, Prague, Czech Republic, pp. 1-2.

Huawei, Hisilicon, "DTX HS-DPCCH for multi-RAB scenario," 3GPP TSG-RAN WG1 Meeting #76, Feb. 10-14, 2014, R1-140690, Prague, Czech Republic, pp. 1-3.

3GPP, "Study on Further Enhanced Uplink (EUL) enhancements," 3GPP TR 25.700, Dec. 2013, v. 12.0.0, pp. 1-146.

Ericsson, "New Work Item proposal: Further EUL enhancements—Core" 3GPP TSG RAN Meeting #62, Dec. 3-6, 2013, RP-132078, Busan, Korea, pp. 1-6.

* cited by examiner

HS-DPCCH OVERHEAD REDUCTION IN MULTI-RAB SCENARIOS

CROSS-REFERENCE TO RELATED APPLICATIONS

The present application for patent claims priority to U.S. Provisional Patent Application No. 61/969,014, "MECHANISMS FOR HS-DPCCH OVERHEAD REDUCTION TO IMPROVE COVERAGE IN MULTI-RAB SCENARIOS" filed Mar. 21, 2014, and assigned to the assignee hereof and hereby expressly incorporated by reference herein in its entirety.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

When a user equipment (UE) is configured in a multiple radio access bearer (multi-RAB) operating mode and is power limited, call drops may occur due to limited transmission power. In particular, the dedicated physical control channel (DPCCH) and dedicated physical data channel (DPDCH) may be allocated insufficient transmit power levels to maintain a call. Therefore, it is desirable to identify ways in which transmit power is more effectively used when a UE is in a multi-RAB operating mode and the power allocated for transmissions is limited.

SUMMARY

The disclosure provides for reducing uplink control channel overhead at a user equipment (UE). The UE may determine that a total transmit power of the UE exceeds an allocated power. The UE may then scale a transmit power of a high-speed dedicated physical control channel (HS-DPCCH) relative to a dedicated physical control channel (DPCCH) in response to the determination that the UE is power limited. The UE may scale the transmit power of the HS-DPCCH when there is no downlink activity as determined, for example, by expiration of a timer. In an aspect, the UE may transmit an indication that the UE is power limited, for example, by using a most-significant bit of a transport format combination index. In another aspect, the UE may receive an indication that a downlink transmission is imminent and, in response, the UE may transmit the HS-DPCCH without scaling its corresponding transmit power.

In an aspect, the disclosure provides a method of reducing uplink control channel overhead at a UE. The method may include determining that a total transmit power of the UE exceeds an allocated power. The method may further include scaling a transmit power of a high-speed dedicated physical control channel (HS-DPCCH) relative to a dedicated physical control channel (DPCCH) in response to the determination that the total transmit power of the UE exceeds the allocated power.

In another aspect, the disclosure provides an apparatus for reducing uplink control channel overhead at a UE. The apparatus may include means for determining that a total transmit power of the UE exceeds an allocated power. The apparatus may further include means for scaling a transmit power of a HS-DPCCH relative to a DPCCH in response to the determination that the total transmit power of the UE exceeds the allocated power.

In another aspect, the disclosure provides another apparatus for reducing uplink control channel overhead at a UE. The apparatus may include a power control component configured to determine that a total transmit power of the UE exceeds an allocated power. The apparatus may further include a channel scaling component configured to scale a transmit power of a HS-DPCCH relative to a DPCCH in response to the determination that the total transmit power of the UE exceeds the allocated power.

Another aspect of the disclosure provides a computer-readable medium storing computer executable code for reducing uplink control channel overhead at a UE. The computer-readable medium may include code for determining that a total transmit power of the UE exceeds an allocated power and code for scaling a transmit power of a HS-DPCCH relative to a DPCCH in response to the determination that the total transmit power of the UE exceeds the allocated power.

The aspects of the present disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a multiple radio access bearer (multi-RAB) scenario, a user equipment (UE) may have more than one wireless connection to a network. For example, the UE may have a first radio access bearer for a circuit switched voice call and may have a second radio access bearer for packet switched data services. A UE operating in a multi-RAB scenario may face power limitations. For example, in order to reduce interference, the UE may be assigned a maximum transmit power that is insufficient to transmit all desired channels at desired levels. That is, the transmit power allocated to the UE is not sufficient to meet the total transmit power requirements of the UE. Such a situation may lead to transmitting vital channels (e.g., control and/or data channels) with insufficient power and to dropped calls.

In an aspect, a UE may reduce uplink transmission power when power limited in a multi-RAB scenario by reducing the transmission power of a high speed dedicated physical control channel (HS-DPCCH). The transmission power for the HS-DPCCH may be scaled or adjusted independently of other uplink channels including the dedicated physical control channel (DPCCH). In one aspect, the transmit power of the HS-DPCCH may be scaled independently when there is no received data on a downlink high speed dedicated shared channel (HS-DSCH). In an example, HS-DPCCH may be scaled independently only when there is no received data on the downlink HS-DSCH. In another aspect, a portion of the HS-DPCCH may be scaled independently, for example, the portion carrying channel quality indicator (CQI) The UE may signal the power-limited condition so that the serving cell may stop downlink transmissions. For example, the UE may use the transport format combination indicator (TFCI) to signal to the serving cell a power-limited condition of the UE. The serving cell may provide an indication that downlink data transmission is imminent, and the UE may provide unscaled HS-DPCCH to provide correct channel information (e.g., CQI) for the downlink transmission.

Figure 1:
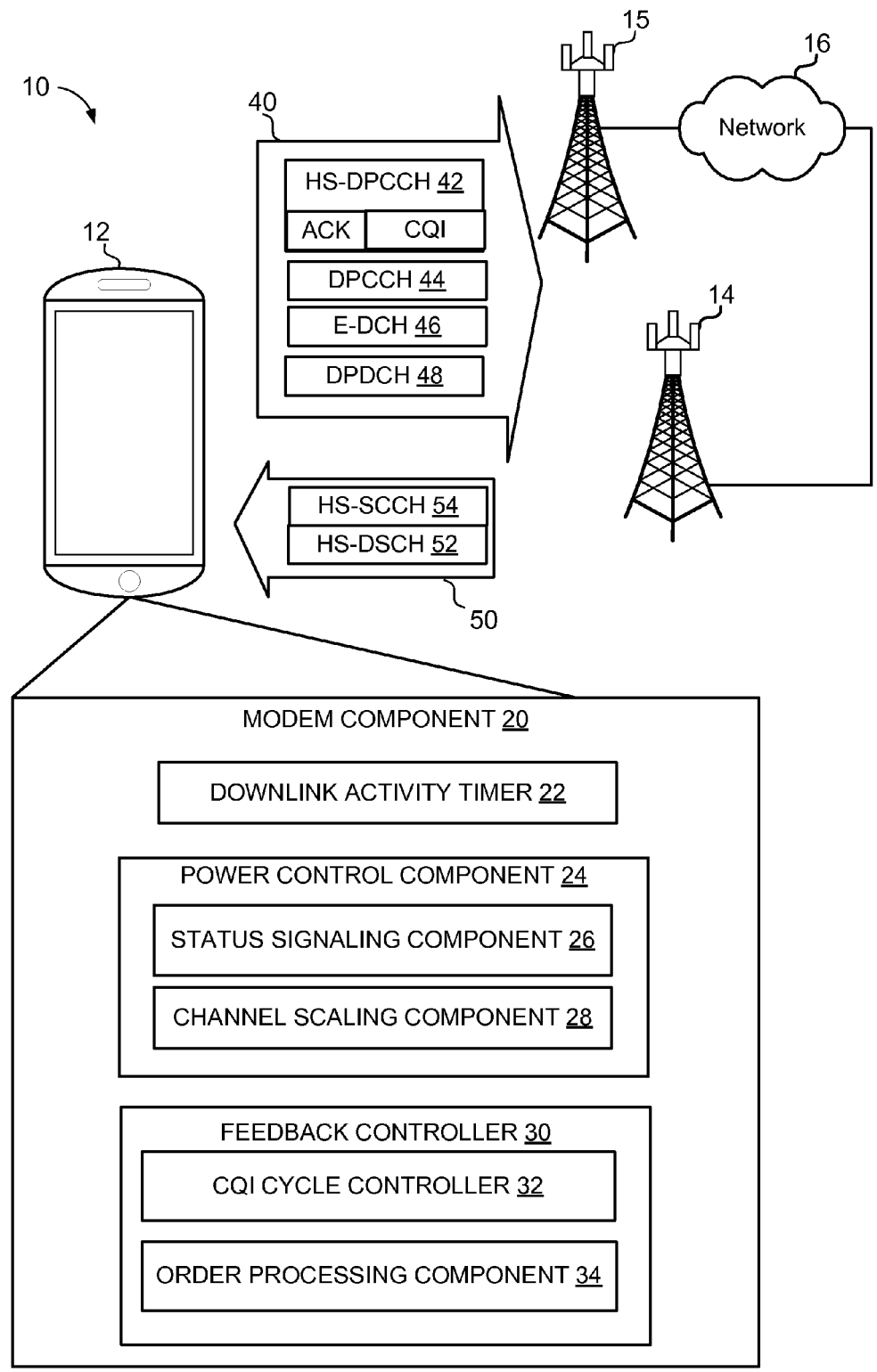
FIG. 1 is a diagram conceptually illustrating a user equipment in communication with a network.

Referring to FIG. 1, in an aspect, a wireless communication system 10 includes at least one UE 12 in communication coverage of at least one network entity 14 (e.g., base station). UE 12 may communicate with network 16 via network entity 14. In some aspects, multiple UEs including UE 12 may be in communication coverage with one or more network entities, including network entity 14. In an example, UE 12 may transmit and/or receive wireless communications to and/or from network entity 14. For example, the UE may transmit uplink signals 40 and receive downlink signals 50. UE 12 may be power controlled to prevent interference to another network entity such as network entity 15, for example. For example, UE 12 may be allocated a limited amount of power for uplink signals 40.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, network entity 14 may be a small cell, macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

The term "small cell," as used herein, refers to a relatively low transmit power and/or a relatively small coverage area cell as compared to a transmit power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area, such as, but not limited to, a building. Further, a femto cell also may cover a relatively small geographic area, such as, but not limited to, a home, or a floor of a building.

According to the present aspects, UE 12 may include modem component 20, which may be configured to control uplink power. For example, the modem component 20 may be configured to control the transmission power used in one or more uplink channels. The modem component 20 may include a downlink activity timer 22, a power control component 24 and a feedback controller 30. In an aspect, the term "component" as used herein may be one of the parts that make up a system, may be hardware or software, and may be divided into other components.

The downlink activity timer 22 may include hardware or means for determining or detecting whether the UE 12 has downlink activity. In an aspect, the downlink activity timer 22 may be configured to measure a configurable period of time since a previous downlink transmission, for example, a data transmission on a high speed dedicated shared channel (HS-DSCH) 52, which may be part of the downlink signal 50. For example, the downlink activity timer 22 may be or may include a memory storing the time of the last downlink transmission or a number of units of time since the last downlink transmission. The downlink activity timer 22 may expire when no subsequent downlink transmissions have occurred within the configurable period of time since the last downlink transmission. In an aspect, the downlink activity timer 22 may be reset whenever a downlink transmission is received. The downlink activity timer 22 may ignore downlink transmissions on other channels. For example, absolute grants, relative grants, paging messages, feedback, and other signaling may not be considered downlink transmissions for the downlink activity timer 22.

The power control component 24 may include hardware or means for controlling the power level (e.g., transmission power) of uplink channels. In an aspect, for example, the power control component 24 may include, or may be executable by, a processor executing firmware or software for controlling the power level of uplink channels. For example, the power control component 24 may be configured to determine that the UE 12 is power limited. In an aspect, the power control component 24 may determine that the UE 12 is power limited based on a maximum allowed transmit power, which in turn may be based on a received grant and power control commands.

The UE 12 may receive a grant on the absolute grant channel (AGCH) and receive power control commands on the relative grant channel (RGCH). The UE 12 may also be power limited by the available transmit power of the UE 12. The power control component 24 may be configured to determine that the UE 12 is power limited when a power necessary to transmit all of the uplink channels exceeds the maximum allowed transmit power. Thus, being a power-limited UE may refer to, for example, having a transmission power requirement that exceeds the maximum allocated or allowed transmission power of the UE. The condition of being power limited may also be described in terms of a power headroom. The power headroom may be a difference between the maximum allowed transmit power and a current transmit power. The UE 12 may be power limited when the power headroom is zero or a negative value.

In an aspect, the power control component 24 may independently control the transmission power of a high speed dedicated physical control channel (HS-DPCCH) 42. The HS-DPCCH 42 may be part of the uplink signals 40 and carry feedback information including an acknowledgment (ACK) and a channel quality indicator (CQI) used by the node B (e.g., network entity 14) for scheduling downlink activity. In an aspect, the power control component 24 may be configured to reduce the transmission power of the HS-DPCCH 42 when the UE is power limited and/or has no downlink activity. The power control component 24 may include a status signaling component 26 and a channel scaling component 28.

The status signaling component 26 may include hardware or means for signaling a power status of the UE 12. For example, the status signaling component 26 may be configured to transmit an indication that the UE 12 is power limited. In an aspect, for example, the status signaling component 26 may include, or may be executable by, a processor executing firmware or software for transmitting an indication that the UE 12 is power limited. The status signaling component 26 may also include a transmitter (not shown) for transmission of the signaling or power status indication. In an aspect, the UE 12 may be power limited when the required total transmit power for all uplink channels exceeds the maximum allowed transmit power as determined by the power control component 24. The status signaling component 26 may detect that the UE 12 is power limited and transmit an indication in an uplink channel. In an aspect, for example, the signaling component 26 may indicate the power status of the UE 12 using a transport format combination indicator (TFCI). The TFCI generally may indicate the transport format combination used for an uplink data transmission. The TFCI may be transmitted on the DPCCH 44. In an aspect, an enhanced TFCI (E-TFCI) transmitted on the E-DCH 46 and indicating the format of data transmitted on the E-DCH 46 may be used to signal the power status of the UE 12. Descriptions herein of the TFCI may be similarly applicable to an E-TFCI. In an aspect, the TFCI may be allocated 10 bits. In an aspect, at least one of the bits of the TFCI may be used to indicate the power status of the UE. For example, the most significant bit may indicate the power status. For example, a value of '1' may indicate that the UE is power limited while a value of '0' may indicate normal operation. The remaining bits of the TFCI may be adequate for signaling the different transport format combinations used in a call. In another aspect, for example, the signaling component 26 may indicate the power status of the UE 12 using a specific CQI value. For example, a CQI value of 0 may indicate that the UE is power limited. In an aspect, the network element 14 may reduce or stop downlink transmissions upon receipt of a power status indication that the UE 12 is power limited. The examples described above are illustrative and non-limiting, thus other indicators may also be used to provide information regarding the power status of UE 12.

The channel scaling component 28 may include hardware or means for scaling (e.g., adjusting) the transmit power of an uplink channel relative to the DPCCH 44. In an aspect, scaling the transmit power may involve reducing the transmit power of a particular channel to a target power level. In an aspect, for example, the channel scaling component 28 may include, or may be executable by, a processor executing firmware or software for scaling the transmit power used by a transmitter for an uplink channel relative to the DPCCH 44. In an aspect, the channel scaling component 28 may scale the HS-DPCCH 42 relative to the DPCCH 44. For example, the channel scaling component 28 may reduce the ratio of the HS-DPCCH power relative to the DPCCH power. In an aspect, the transmit power of the DPCCH 44 may remain constant (or as determined necessary) while the transmit power of the HS-DPCCH 42 is reduced below a determined level. Power levels for other channels within the uplink signals 40 may remain constant with respect to the DPCCH 44. For example, the channel scaling component 28 may reduce the power of HS-DPCCH such that the total transmission power for all uplink channels does not exceed a maximum allowed transmit power. For example, the channel scaling component 28 may apply a scaling factor to the gain factor, $\beta_{hs}$, for the HS-DPCCH based on the maximum allowed transmit power. The channel scaling component 28 may scale the transmission power of HS-DPCCH 42 to zero or discontinuous transmission (DTX) before scaling the transmission power of DPCCH 44.

By scaling the HS-DPCCH 42 independently of the DPCCH 44, the channel scaling component 28 may allow the DPCCH 44 and related channels to maintain higher power levels for maintaining a call, for example, a voice call on the DPDCH 48. In an aspect, the channel scaling component 28 may scale the power for only a portion of the HS-DPCCH 42. For example, the channel scaling component 28 may independently scale the transmit power of the HS-DPCCH 42 during the time slots in which the HS-DPCCH 42 is carrying the CQI and refrain from independently scaling the HS-DPCCH 42 when the HS-DPCCH 42 is carrying the ACK.

In an aspect, the channel scaling component 28 may scale the power of the HS-DPCCH 42 only when the UE 12 is power limited and the downlink activity timer 22 is expired. The channel scaling component 28 may scale the power of the HS-DPCCH 42 in response to a determination that the total transmit power of the UE exceeds the allocated power. The channel scaling component 28 may also scale the power of the DPCCH 42 in response to a determination that the UE 12 has no downlink activity.

The feedback controller 30 may include hardware or means for controlling feedback regarding the downlink such as CQI feedback. In an aspect, for example, the feedback controller 30 may include, or may be executable by a processor executing firmware or software for controlling a CQI cycle. The CQI cycle may be a time period such as a number of time slots or transmission time intervals between transmissions of a CQI. The feedback controller 30 may include a CQI cycle controller 32 and an order processing component 34.

The CQI cycle controller 32 may include hardware or means for reducing the CQI cycle based on a determination that there is no downlink traffic. In an aspect, for example, the CQI cycle controller 32 may include, or may be executable by, a processor executing firmware or software for a reducing the CQI cycle. For example, the CQI cycle controller 32 may reduce the CQI cycle responsive to the downlink activity timer 22 expiring. The CQI cycle controller 32 may reduce the CQI to a configured value lower than a normal CQI feedback cycle. For example, instead of reporting a CQI every sub-frame, the UE 12 may report a CQI every Nth sub-frame, where N is an integer greater than one. The CQI cycle controller 32 may also completely stop the UE 12 from reporting CQI. By reducing the CQI cycle, the CQI cycle controller 32 may reduce the amount of data transmitted in the uplink by UE 12.

The order processing component 34 may include hardware or means for processing control orders received from a serving cell (e.g., network entity 14 or 15). In an aspect, for example, the order processing component 34 may include or be executable by a processor executing firmware or software for processing high speed-shared control channel (HS-SCCH) orders. An HS-SCCH order may be a low level (e.g. PHY layer or L1) command carried on the downlink HS-SCCH that may be used to quickly reconfigure the UE 12. For example, the network entity 14 may provide an HS-SCCH order indicating that a downlink transmission is imminent. An imminent transmission may be a transmission scheduled within a certain time period or number of subframes. For example, the HS-SCCH order may indicate a certain time period or number of subframes until a scheduled HS-DPCH transmission for the UE 12. The HS-SCCH order may also indicate an imminent transmission without providing a specific time period. The order processing component 34 may return the CQI cycle of the UE 12 to the normally configured CQI cycle. The order processing component 34 may also initiate an immediate CQI transmission. For example, the order processing component 34 may trigger transmission of a CQI on the HS-DCCH in the next sub-frame. The CQI may provide information useful for formatting the downlink transmission. The HS-DCCH may be transmitted with unscaled power. For example, the UE 12 may transmit the HS-DCCH with a necessary power level even if the total power level exceeds the maximum allowed transmission power. As another example, the HS-DCCH may be transmitted with unscaled power relative to the DPCCH (e.g. using uniform scaling).

Figure 2:
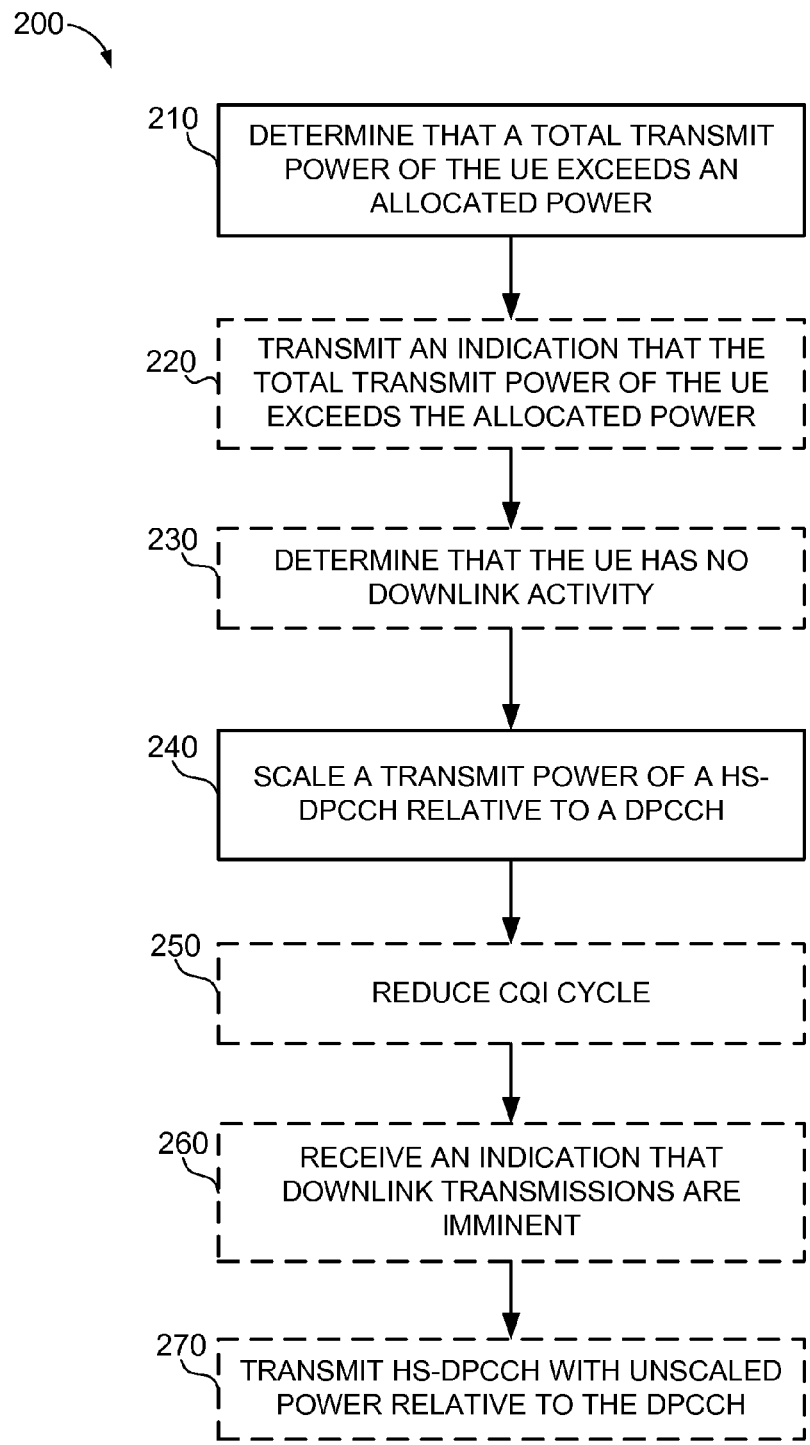
FIG. 2 is a flow diagram conceptually illustrating a method of controlling uplink transmit power.

FIG. 2 is a flow diagram conceptually illustrating a method 200 of power control. The method 200 may be performed by a UE 12 including the modem component 20.

In an aspect, at block 210, the method 200 may include determining that a total transmit power of the UE 12 exceeds an allocated power. For example, in an aspect, the power control component 24 may determine that the total transmit power of the UE 12 exceeds the allocated power. The power control component 24 may determine that the UE 12 is power limited based on a maximum allowed transmit power and a power for transmitting the uplink channels.

At block 220, the method 200 may optionally include transmitting an indication that the total transmit power of the UE 12 exceeds the allocated power. In an aspect, for example, the status signaling component 26 may transmit the indication that the total transmit power of the UE 12 exceeds the allocated power. The TFCI may be used to transmit the indication that the total transmit power of the UE 12 exceeds the allocated power. For example, the most significant bit of the TFCI may indicate whether the a total transmit power of the UE 12 exceeds an allocated power. As another example, a CQI value of 0 may indicate that the total transmit power of the UE 12 exceeds the allocated power.

At block 230, the method 200 may optionally include determining that the UE 12 has no downlink activity. In an aspect, for example, the downlink activity timer 22 may be used to determine whether the UE 12 has downlink activity. For example, if the downlink activity timer 22 has expired, the UE 12 may have no downlink activity. If the downlink activity timer 22 has not expired, the UE 12 may have downlink activity.

At block 240, the method 200 may include scaling a transmit power of a HS-DPCCH relative to a DPCCH. In an aspect, for example, the channel scaling component 28 may scale a transmit power of a HS-DPCCH relative to a DPCCH. Scaling the transmit power of the HS-DPCCH may be in response determining that a total transmit power of the UE 12 exceeds an allocated power and/or determining that the UE has no downlink activity in block 30. The channel scaling component 28 may reduce the power for transmitting a channel quality indicator portion of the HS-DPCCH. Further, if there is no downlink activity, the power scaling component 28 may also reduce the power for transmitting an ACK portion of the HS-DPCCH. In an aspect, the transmit power of the HS-DPCCH may be scaled before scaling is applied to other uplink channels. For example, the channel scaling component 28 may first scale the transmit power for the E-DCH, then scale the transmit power for HS-DPCCH, then scale the transmit power for the remaining uplink channels. Alternatively, HS-DPCCH may be scaled before the E-DCH.

At block 250, the method 200 may optionally include reducing a CQI cycle. In an aspect, for example, the CQI cycle controller 32 may reduce the CQI cycle. The CQI cycle may be reduced responsive to determining that the UE has no downlink activity in block 230. The CQI cycle controller 32 may determine a time between CQI transmissions that is greater than a normal time between CQI transmissions. Accordingly, the UE 12 may transmit CQI information less frequently.

At block 260, the method 200 may optionally include receiving an indication that a downlink transmission is imminent. In an aspect, for example, the order processing component 34 may receive an indication that a downlink transmission is imminent. For example, the order processing component 34 may receive an HS-SCCH order indicating that data will be transmitted to the UE on a HS-DSCH.

At block 270, the method 200 may optionally include transmitting the HS-DPCCH with unscaled power relative to the DPCCH. In an aspect, for example, the channel scaling component 28 may transmit the HS-DPCCH with unscaled power relative to the DPCCH. Transmitting the HS-DPCCH with unscaled power relative to the DPCCH may be in response to receiving the indication that a downlink transmission is imminent. For example, the channel scaling component may refrain from independently scaling the power of the HS-DPCCH in response to the indication that a downlink transmission is imminent. The UE 12 may still uniformly scale the HS-DPCCH with respect to the DPCCH if necessary to remain under the maximum allowed transmit power. In an aspect, the order processing component 34 may trigger a transmission of the CQI on the unscaled HS-DPCCH if, for example, the CQI cycle has been reduced. For example, the order processing component 34 may trigger transmission of the CQI in the next available sub-frame.

Figure 3:
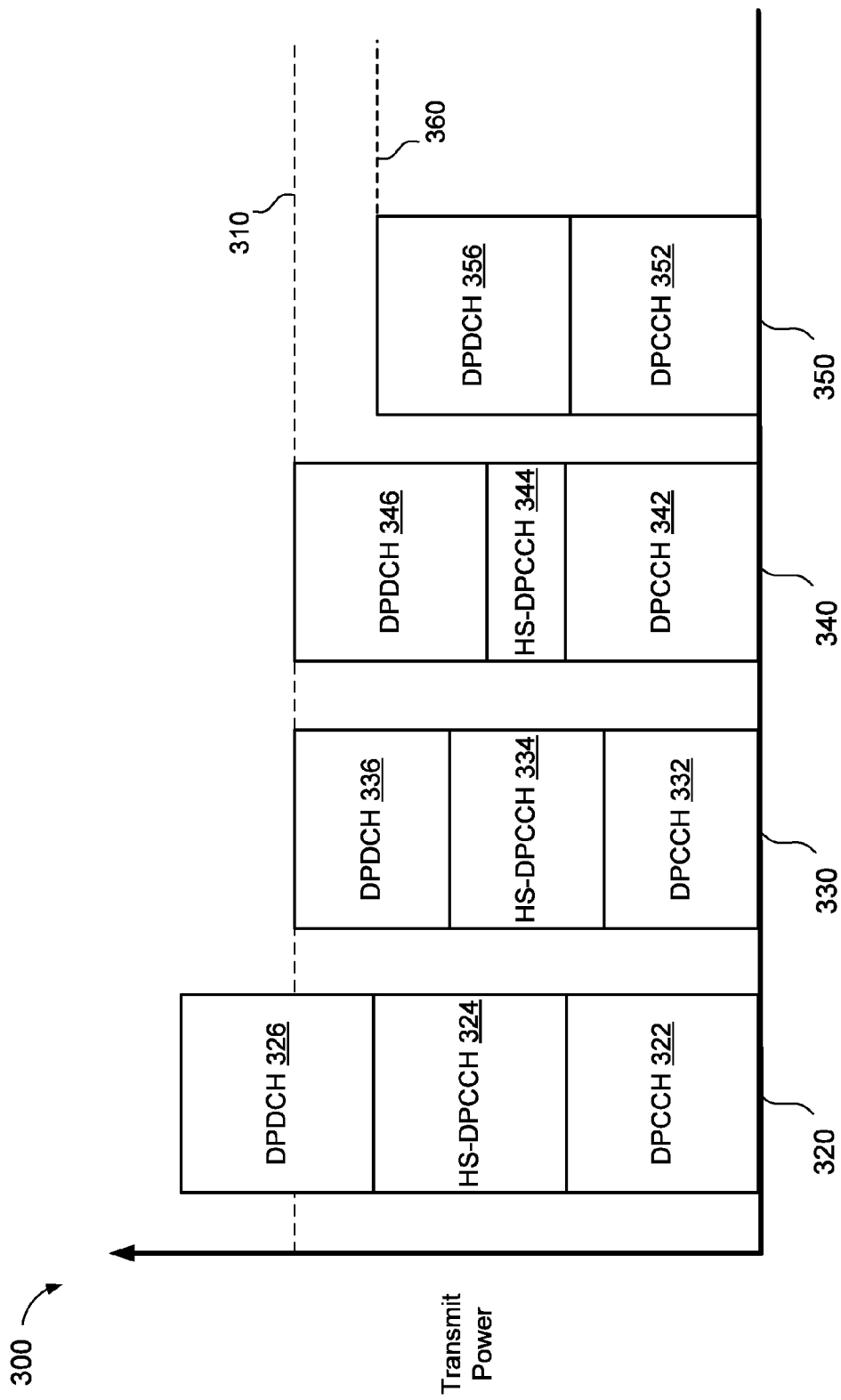
FIG. 3 is a diagram conceptually illustrating power scaling.

FIG. 3 is a conceptual diagram illustrating power scaling of uplink channels. For example, the scaling of uplink channels may be performed by a channel scaling component 28 (FIG. 1) within a UE 12. The maximum allowed transmit power 310 may be determined by the power control component 24 (FIG. 1) based on an absolute grant and/or relative grants. The maximum allowed transmit power 310 may also be limited by the characteristics of the UE. For example, the UE 12 may be unable to transmit above the maximum allowed transmit power 310 even if the absolute grant provides for a higher transmit power than the one UE 12 is capable of providing.

Transmission 320 may illustrate a transmission power for transmitting unscaled uplink channels including DPDCH 326, HS-DPCCH 324, and DPCCH 322. For simplicity, E-DCH channels are not shown. The E-DCH channels may not be configured, or may be scaled to zero transmit power before other uplink channels. The UE 12 may be unable to transmit the unscaled uplink channels of transmission 320 because of the maximum allowed transmit power 310. Accordingly, the UE 12 may be power limited because the transmission power for the unscaled uplink channels exceeds the maximum allowed transmit power 310.

Transmission 330 may illustrate transmission power for transmitting uniformly scaled uplink channels including DPDCH 336, HS-DPCCH 334, and DPCCH 332. The transmission power for DPDCH 336 may be reduced compared to the transmission power for DPDCH 326. In an aspect, if DPDCH 336 is being used to carry a delay sensitive application such as a voice call, scaling the DPDCH 336 may result in transmission errors, a reduction in call quality, and/or a dropped call.

Transmission 340 may illustrate transmission power for transmitting uplink channels with selective scaling applied to HS-DPCCH 344 and no scaling applied to DPCCH 342 and DPDCH 346. DPCCH 342 may be transmitted with the same transmission power as DPCCH 322. Likewise, DPDCH 346 may be transmitted with the same transmission power as DPDCH 326, that is, the required transmission power. Accordingly, the DPDCH 346 may be more likely to be received without errors than the DPDCH 336. A voice call carried on the DPDCH 336 may be less likely to have reduced quality or less likely to be dropped.

Transmission 350 may illustrate a transmission power when maximum selective scaling of an HS-DPCCH is used. The transmission 350 may have no power allocated to an HS-DPCCH. DPDCH 356 may be transmitted with the unscaled transmit power of DPDCH 326. The total transmit power for the uplink channels may be a transmit power 360, which may be less than the maximum allowed transmit power 310. Accordingly, UE 12 may transmit at a lower power and generate less interference while maintaining call quality using selective scaling of the HS-DPCCH under appropriate conditions. Further, the UE 12 may be configured to use uniform scaling and/or selective scaling operations, and may be configured to select between them according to certain operating conditions or preferences. For example, selective scaling may be used when the UE 12 has no downlink activity. Also, uniform scaling may be applied after selective scaling when the selective scaling does not sufficiently reduce the total transmission power.

Figure 4:
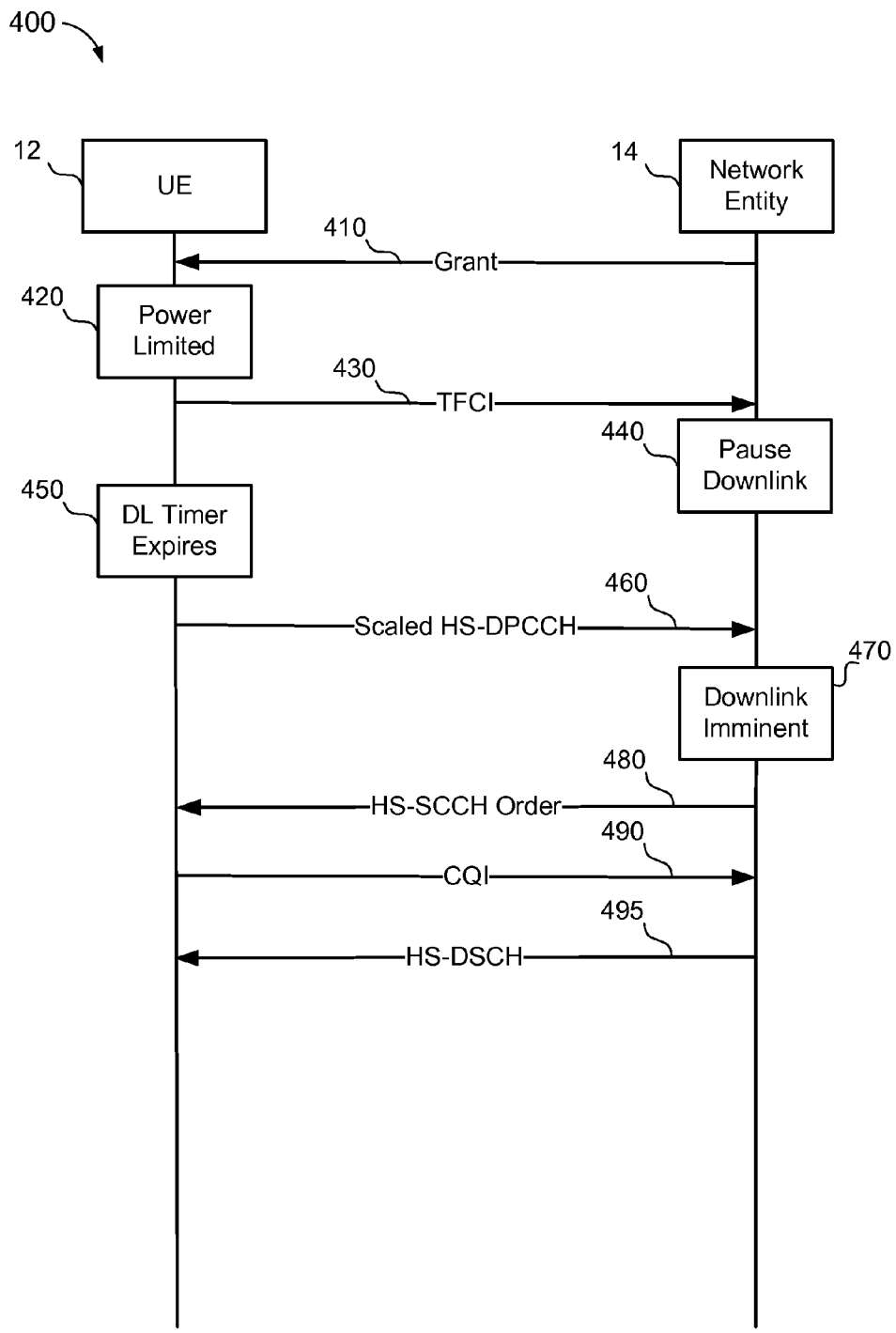
FIG. 4 is a diagram conceptually illustrating communications between a user equipment and a network.

FIG. 4 illustrates a diagram showing messages transmitted in a network between a UE 12 and a network entity 14. The message 410 may be a grant transmitted by the network entity 14 and received by the UE 12. The grant may indicate or be used to determine a maximum allowed (allocated) transmit power. At block 420, the UE 12 may determine that the UE 12 is power limited. Message 430 from UE 12 to network entity 14 may include a TFCI or CQI indicating that the UE 12 is power limited. In an aspect, at block 440, the network entity 14 may pause or otherwise limit downlink transmissions to UE 12 in response to receiving the message 430 indicating that the UE 12 is power limited. At block 450, the downlink timer 22 at the UE 12 may expire because the network entity 14 has not been transmitting downlink data. The message 460 from UE 12 to network entity 14 may be an uplink transmission including the independently scaled HS-DPCCH. The message 460 may also include other uplink channels such as the DPDCH and DPCCH, which are not scaled. The message 460 may also include a TFCI indicating the format of, for example, the DPDCH as well as an indicator of the current power status of the UE 12. For example, the UE 12 may remain in a power limited state or may no longer be power limited if the grant has changed. In block 470, the network entity 14 may determine that a downlink is imminent. For example, the network entity 14 may have high priority data to transmit. The message 480 from network entity 14 to UE 12 may be an HS-SCCH order indicating that a downlink transmission is imminent. The message 490 from UE 12 to network entity 14 may be an unscaled HS-DPCCH including a CQI. The message 495 from network entity 14 to UE 12 may include downlink data carried in the HS-DSCH in a transport block size selected based on the CQI.

Figure 5:
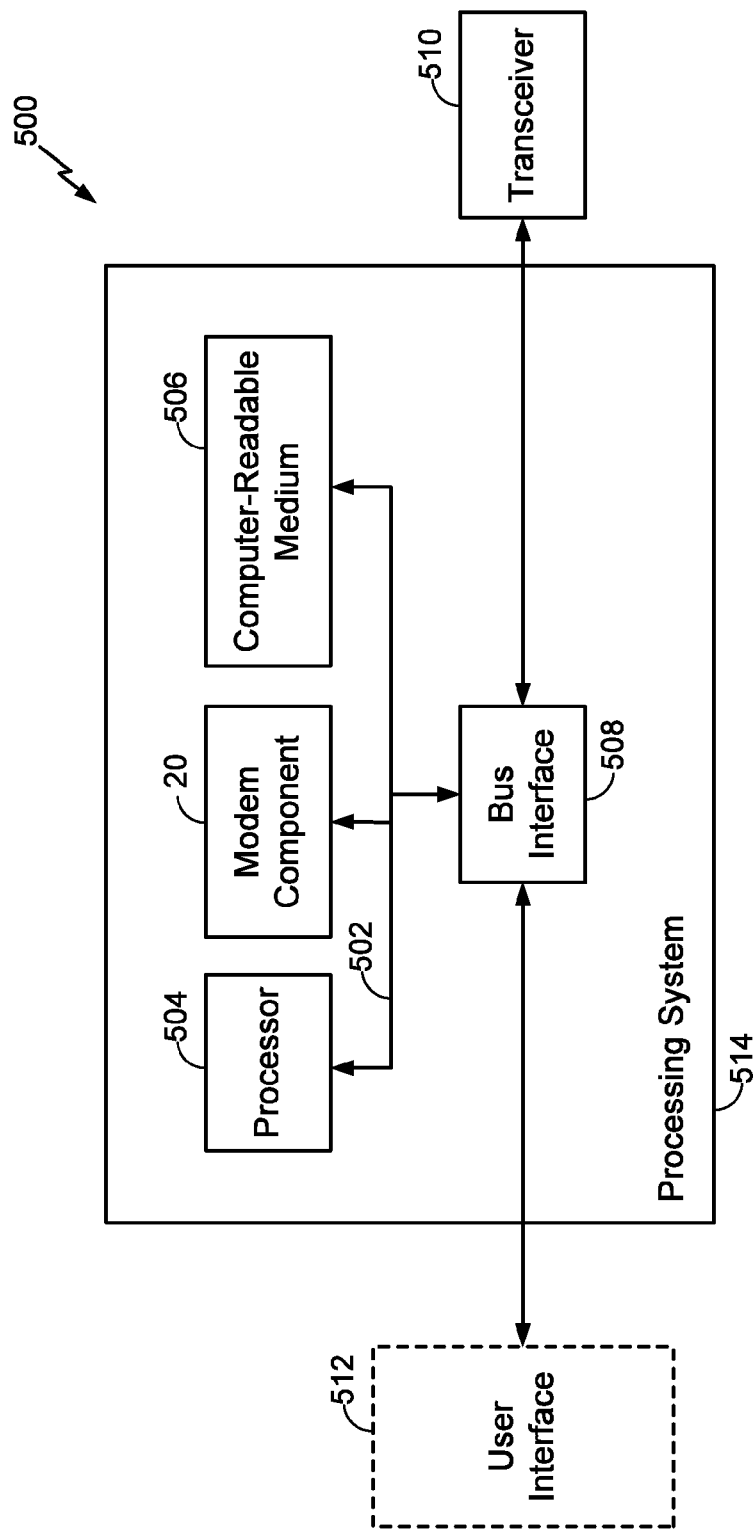
FIG. 5 is a diagram conceptually illustrating an example of a hardware implementation for an apparatus employing a processing system.

FIG. 5 is a block diagram illustrating an example of a hardware implementation for an apparatus 500 employing a processing system 514 including a modem component 20. In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506. The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described infra for any particular apparatus. The computer-readable medium 506 may also be used for storing data that is manipulated by the processor 504 when executing software.

The modem component 20 may include hardware configured for controlling transmission (e.g., power level transmissions) of the processing system 514. The modem component 20 may be a separate component, or may be integrated with the processor 504 or the computer-readable medium 506. The modem component 20 may control transceiver 510 for transmitting uplink channels and receiving downlink channels. The modem component 20 may update status information, which may be stored in the computer-readable medium 506 and used by the processor 504.

Further, modem component 20 (FIG. 1) may be implemented by any one or more of processor 504 and computer-readable medium 506. For example, the processor and/or computer-readable medium 506 may be configured to, via modem component 20, control the power of a user equipment (e.g., UE 12). Accordingly, the modem component 20 may be implemented as hardware, software, firmware, etc.

The various concepts presented throughout this disclosure may be implemented across a broad variety of telecommunication systems, network architectures, and communication standards. By way of example and without limitation, the aspects of the present disclosure illustrated in FIGS. 1-5 are presented with reference to a UMTS system 600 employing a W-CDMA air interface. A UMTS network includes three interacting domains: a Core Network (CN) 604, a UMTS Terrestrial Radio Access Network (UTRAN) 602, and User Equipment (UE) 610. The UE 610 may correspond to the UE 12 and include a modem component 20 for performing security mode procedures.

In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 and a Node B 608 may be considered as including a physical (PHY) layer and a medium access control (MAC) layer. Further, communication between a UE 610 and an RNC 606 by way of a respective Node B 608 may be considered as including a radio resource control (RRC) layer. In the instant specification, the PHY layer may be considered layer 1; the MAC layer may be considered layer 2; and the RRC layer may be considered layer 3. Information herein utilizes terminology introduced in the RRC Protocol Specification.

The geographic region covered by the RNS 607 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each RNS 607; however, the RNSs 607 may include any number of wireless Node Bs. The Node Bs 608 provide wireless access points to a CN 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the Node Bs 608. The downlink (DL), also called the forward link, refers to the communication link from a Node B 608 to a UE 610, and the UL, also called the reverse link, refers to the communication link from a UE 610 to a Node B 608.

The CN 604 interfaces with one or more access networks, such as the UTRAN 602. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile Services Switching Centre (MSC), a Visitor location register (VLR) and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 608 and a UE 610. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to the node B 608 over the HS-DPCCH to indicate whether it correctly decoded a packet on the downlink.

HS-DPCCH further includes feedback signaling from the UE 610 to assist the node B 608 in taking the right decision in terms of modulation and coding scheme and precoding weight selection, this feedback signaling including the channel quality indicator (CQI) and precoding matrix indicator (PMI).

"HSPA Evolved" or HSPA+ is an evolution of the HSPA standard that includes MIMO and 64-QAM, enabling increased throughput and higher performance. That is, in an aspect of the disclosure, the node B 608 and/or the UE 610 may have multiple antennas supporting MIMO technology. The use of MIMO technology enables the node B 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 610 to increase the data rate or to multiple UEs 610 to increase the overall system capacity. This is achieved by spatially precoding each data stream and then transmitting each spatially precoded stream through a different transmit antenna on the downlink. The spatially precoded data streams arrive at the UE(s) 610 with different spatial signatures, which enables each of the UE(s) 610 to recover the one or more the data streams destined for that UE 610. On the uplink, each UE 610 may transmit one or more spatially precoded data streams, which enables the node B 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
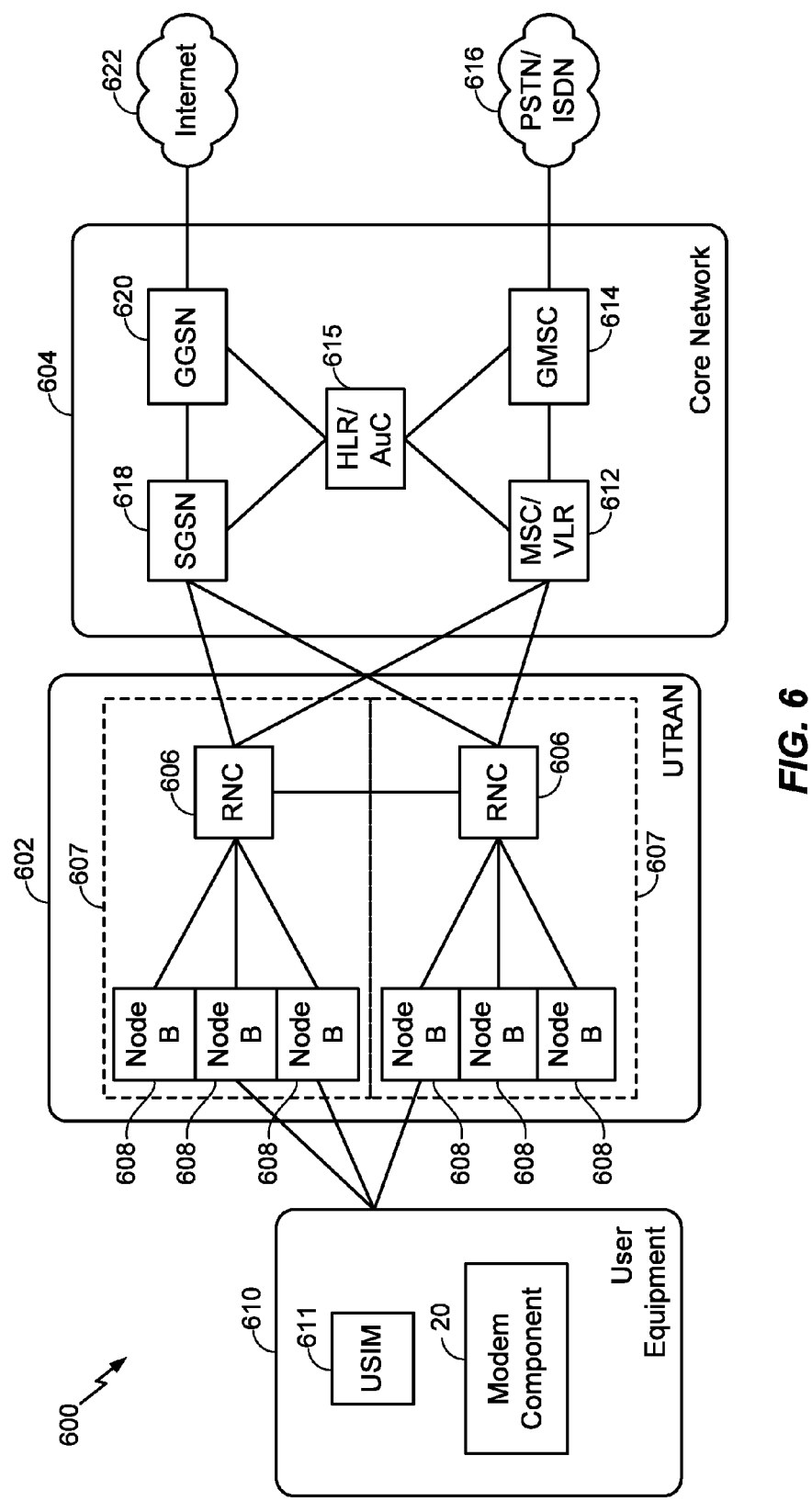
FIG. 6 is a block diagram conceptually illustrating an example of a telecommunications system.
Figure 7:
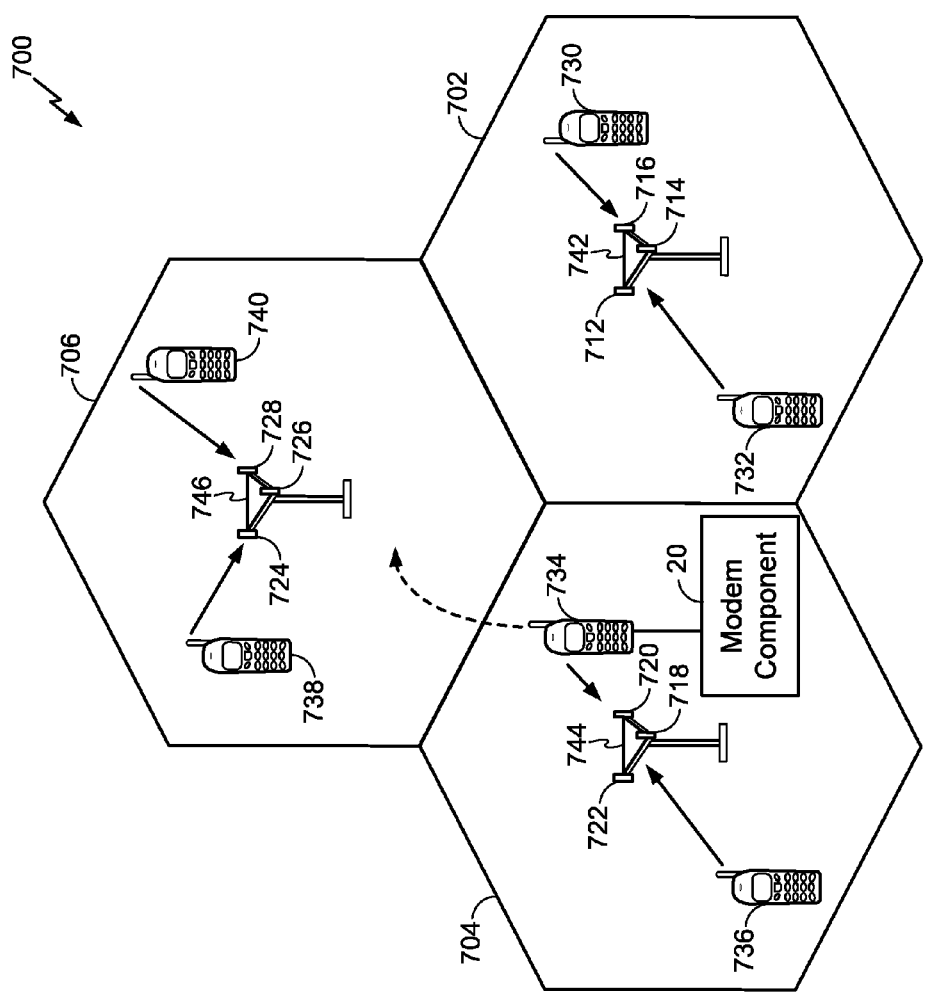
FIG. 7 is a conceptual diagram illustrating an example of an access network.

Referring to FIG. 7, an access network 700 in a UTRAN architecture is illustrated. The multiple access wireless communication system includes multiple cellular regions (cells), including cells 702, 704, and 706, each of which may include one or more sectors. The UEs 730, 732, 734, 736, 738, 740 may each correspond to the UE 12 (FIG. 1) and include a modem component 20. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with Node B 742, UEs 734 and 736 may be in communication with Node B 744, and UEs 738 and 740 can be in communication with Node B 746. Here, each Node B 742, 744, 746 is configured to provide an access point to a CN 604 (see FIG. 6) for all the UEs 730, 732, 734, 736, 738, 740 in the respective cells 702, 704, and 706.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 606 (see FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel (DPCH) or fractional downlink dedicated physical channel (F-DPCH) to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 8.

Figure 8:
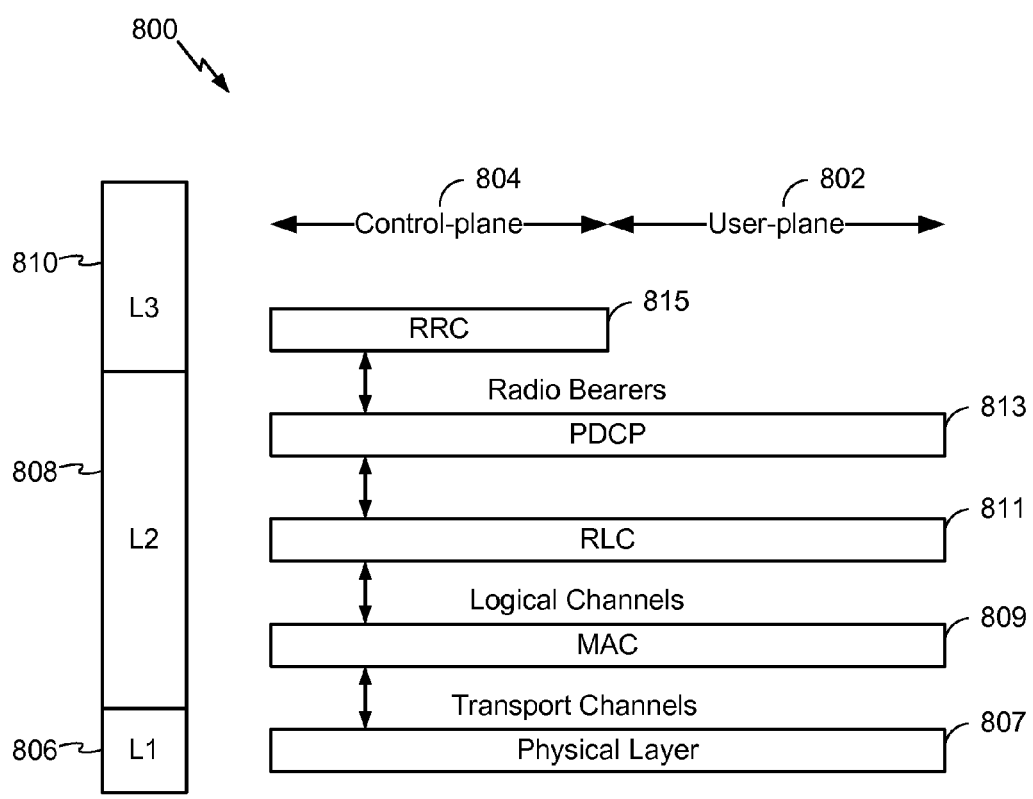
FIG. 8 is a conceptual diagram illustrating a radio protocol architecture.

Referring to FIG. 8, an example radio protocol architecture 800 relates to the user plane 802 and the control plane 804 of a user equipment (UE) or node B/base station. For example, architecture 800 may be included in a UE such as UE 12 (FIG. 1) having a modem component 20. The radio protocol architecture 800 for the UE and node B is shown with three layers: Layer 1 806, Layer 2 808, and Layer 3 810. Layer 1 806 is the lowest layer and implements various physical layer signal processing functions. As such, Layer 1 806 includes the physical layer 807. Layer 2 (L2 layer) 808 is above the physical layer 807 and is responsible for the link between the UE and node B over the physical layer 807. Layer 3 (L3 layer) 810 includes a radio resource control (RRC) sublayer 815. The RRC sublayer 815 handles the control plane signaling of Layer 3 between the UE and the UTRAN. The modem component 20 may operate at Layer 1 to control the transmission power, but may also provide layer 2 control and layer 3 signaling.

In the user plane, the L2 layer 808 includes a media access control (MAC) sublayer 809, a radio link control (RLC) sublayer 811, and a packet data convergence protocol (PDCP) 813 sublayer, which are terminated at the node B on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 813 provides multiplexing between different radio bearers and logical channels. The PDCP sublayer 813 also provides header compression for upper layer data packets to reduce radio transmission overhead, security by ciphering the data packets, and handover support for UEs between node Bs. The RLC sublayer 811 provides segmentation and reassembly of upper layer data packets, retransmission of lost data packets, and reordering of data packets to compensate for out-of-order reception due to hybrid automatic repeat request (HARQ). The MAC sublayer 809 provides multiplexing between logical and transport channels. The MAC sublayer 809 is also responsible for allocating the various radio resources (e.g., resource blocks) in one cell among the UEs. The MAC sublayer 809 is also responsible for HARQ operations.

Figure 9:
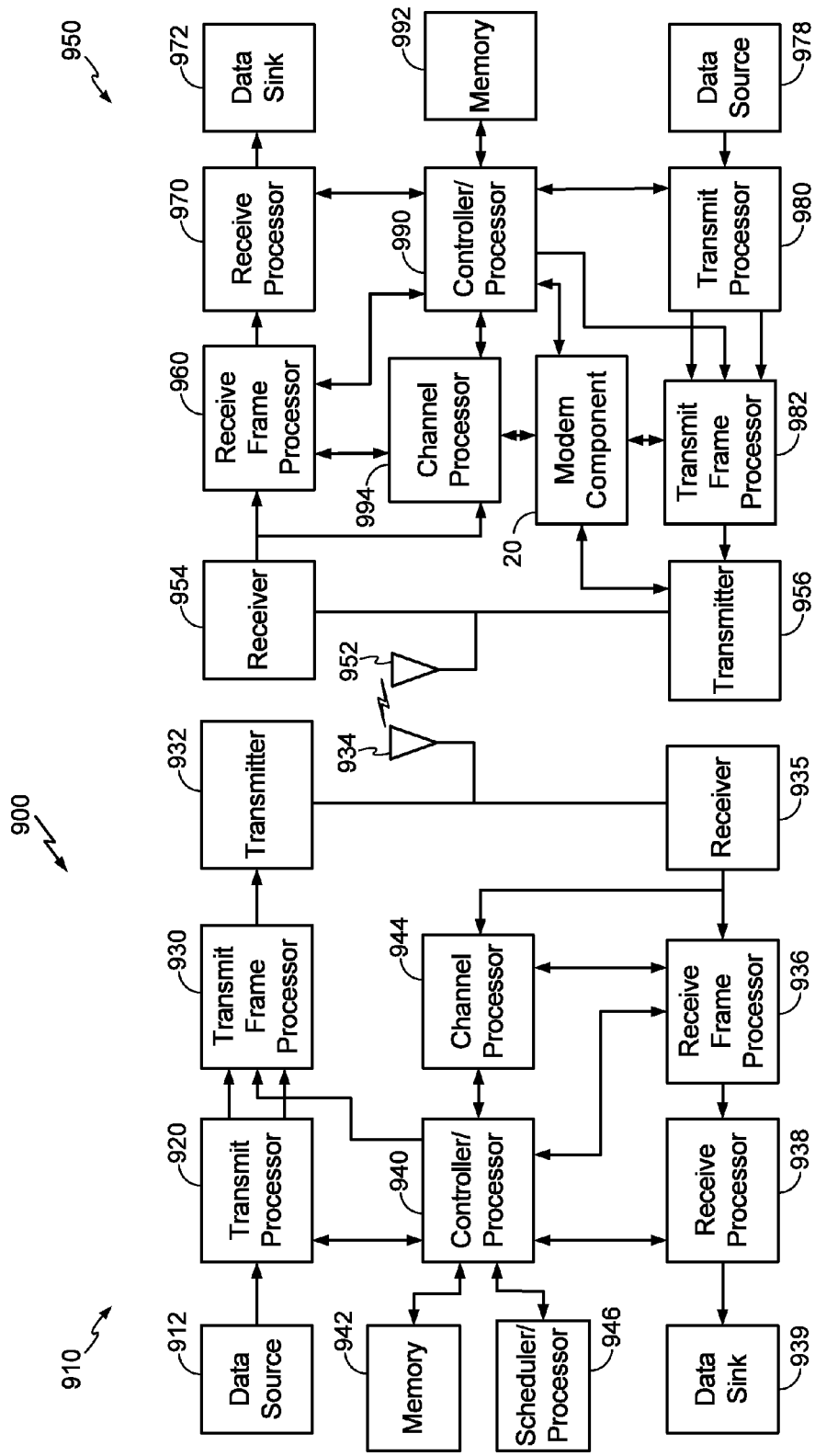
FIG. 9 is a block diagram conceptually illustrating an example of a Node B in communication with a UE in a telecommunications system.

FIG. 9 is a block diagram of a Node B 910 in communication with a UE 950, where the Node B 910 may be the network entity 14 in FIG. 1 or Node B 208 in FIG. 6, and the UE 950 may be the UE 12 in FIG. 1 or the UE 210 in FIG. 6. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the Node B 910. More specifically, the receive processor 970 descrambles and despreads the symbols, and then determines the most likely signal constellation points transmitted by the Node B 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames. The channel processor 994 may also determine channel conditions for the downlink channel and generate the CQI. The ACK/NACK and CQI may be transmitted to the base station 910 on the HS-DPCCH. The modem component 20 may operate as described above and may, for example, scale the transmission power of the HS-DPCCH when the UE 950 is power limited and/or there is no downlink traffic to the UE 950. In an aspect, the modem component 20 may be integrated with or implemented by the controller/processor 990, transmit frame processor 982, and/or transmitter 956.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the Node B 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the Node B 910 or from feedback contained in the midamble transmitted by the Node B 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the Node B 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the Node B 910 and the UE 950, respectively. For example, the controller/processors 940 and 990 may provide various functions including timing, peripheral interfaces, voltage regulation, power management, and other control functions. The computer readable media of memories 942 and 992 may store data and software for the Node B 910 and the UE 950, respectively. A scheduler/processor 946 at the Node B 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of reducing uplink control channel overhead at a user equipment (UE), the method comprising:
    determining that a total transmit power of the UE exceeds an allocated power;
    scaling a transmit power of a high-speed dedicated physical control channel (HS-DPCCH) relative to a transmit power of a dedicated physical control channel (DPCCH) to reduce the ratio of the HS-DPCCH power relative to the DPCCH power such that the HS-DPCCH is transmitted with a reduced transmit power in response to the determination that the total transmit power of the UE exceeds the allocated power; and
    transmitting an indication that the total transmit power of the UE exceeds the allocated power, wherein the indication is signaled through a transport format combination index (TFCI) field of the DPCCH.

2. The method of claim 1, wherein scaling the transmit power of the HS-DPCCH includes reducing an amount of power for transmitting a channel quality indicator (CQI) portion of the HS-DPCCH.

3. The method of claim 1, further comprising determining that the UE has no downlink activity, wherein the scaling the transmit power of the HS-DPCCH is further in response to the determination that the UE has no downlink activity.

4. The method of claim 3, wherein determining that the UE has no downlink activity includes determining that a defined time period since a previous downlink transmission has expired.

5. The method of claim 3, further comprising reducing a CQI cycle in response to the determination that the UE has no downlink activity.

6. The method of claim 1, wherein the indication is provided by at least a most-significant bit of the TFCI field.

7. The method of claim 1, wherein the indication further includes a CQI having a value of 0.

8. The method of claim 1, further comprising receiving an indication that a downlink transmission will occur within a defined number of subframes and transmitting the HS-DPCCH in a subframe subsequent to the indication with unsealed transmit power in response to the indication.

9. The method of claim 8, wherein the indication that the downlink transmission will occur within a defined number of subframes is provided by a high speed shared control channel (HS-SCCH) order.

10. The method of claim 1, wherein the HS-DPCCH is scaled relative to the DPCCH before any scaling is applied to the DPCCH.

11. An apparatus for reducing uplink control channel overhead at a user equipment (UE), the apparatus comprising:
    means for determining that a total transmit power of the UE exceeds an allocated power;
    means for scaling a transmit power of a high-speed dedicated physical control channel (HS-DPCCH) relative to a transmit power of a dedicated physical control channel (DPCCH) to reduce the ratio of the HS-DPCCH power relative to the DPCCH power such that the HS-DPCCH is transmitted with a reduced transmit power in response to the determination that the total transmit power of the UE exceeds the allocated power; and
    means for signaling an indication that the total transmit power of the UE exceeds the allocated power, wherein the indication is signaled through a transport format combination index (TFCI) field of the DPCCH.

12. The apparatus of claim 11, wherein the means for scaling the transmit power of the HS-DPCCH are configured to reduce an amount of power for transmitting a channel quality indicator (CQI) portion of the HS-DPCCH.

13. The apparatus of claim 11, further comprising means for determining that the UE has no downlink activity, wherein the scaling the transmit power of the HS-DPCCH is further in response to the determination that the UE has no downlink activity.

14. The apparatus of claim 13, further comprising means for reducing a CQI cycle responsive to determining that the UE has no downlink activity.

15. The apparatus of claim 11, further comprising means for receiving an indication that a downlink transmission will occur within a defined number of subframes and means for transmitting the HS-DPCCH with unsealed power in a subframe subsequent to the indication in response to the indication.

16. An apparatus for reducing uplink control channel overhead at a user equipment (UE), the apparatus comprising:
    a transceiver configured to transmit a high-speed dedicated physical control channel (HS-DPCCH);
    a memory; and
    a processor communicatively coupled to the transceiver and the memory, the processor configured to:
    determine that a total transmit power of the UE exceeds an allocated power;
    scale a transmit power of the HS-DPCCH relative to a transmit power of a dedicated physical control channel (DPCCH) to reduce the ratio of the HS-DPCCH power relative to the DPCCH power such that the HS-DPCCH is transmitted with a reduced transmit power in response to the determination that the total transmit power of the UE exceeds the allocated power; and transmit an indication that the total transmit power of the UE exceeds the allocated power, wherein processor is configured to set a value of a transport format combination index (TFCI) field of the DPCCH to indicate that the total transmit power of the UE exceeds the allocated power.

17. The apparatus of claim 16, wherein the processor is configured to reduce an amount of power for transmitting a channel quality indicator (CQI) portion of the HS-DPCCH.

18. The apparatus of claim 16, wherein the processor is configured to determine that the UE has no downlink activity.

19. The apparatus of claim 18, wherein the processor is configured to reduce a CQI cycle responsive to determining that the UE has no downlink activity.

20. The apparatus of claim 16, wherein the indication includes at least a most-significant bit of the TFCI field.

21. The apparatus of claim 16, wherein the processor is configured to set a value of the CQI to 0 to indicate that the total transmit power of the UE exceeds the allocated power.

22. The apparatus of claim 16, wherein the processor is configured to receive an indication that a downlink transmission will occur within a defined number of subframes, wherein the processor is configured to transmit the HS-DPCCH in a subframe subsequent to the indication with unscaled power in response to the indication.

23. The apparatus of claim 22, wherein the indication that the downlink transmission will occur within a defined number of subframes is a high speed shared control channel (HS-SCCH) order.

24. The apparatus of claim 16, wherein the channel scaling component is configured to scale the transmit power of the HS-DPCCH before scaling is applied to a transmit power for an enhanced dedicated channel (E-DCH).

25. A non-transitory computer-readable medium storing computer executable code for reducing uplink control channel overhead at a user equipment (UE), comprising:

code for determining that a total transmit power of the UE exceeds an allocated power;

code for scaling a transmit power of a high-speed dedicated physical control channel (HS-DPCCH) relative to a transmit power of a dedicated physical control channel (DPCCH) to reduce the ratio of the HS-DPCCH power relative to the DPCCH power such that the HS-DPCCH is transmitted with a reduced transmit power in response to the determination that the total transmit power of the UE exceeds the allocated power; and code for transmitting an indication that the total transmit power of the UE exceeds the allocated power, wherein the indication is signaled through a transport format combination index (TFCI) field of the DPCCH.

* * * * *